March 17, 1959

H. E. STOVER 2,877,493

DEVICE FOR MOLDING GASKETS

Filed Jan. 4, 1956

INVENTOR
Harry E. Stover
BY
Norman Holland
ATTORNEY

March 17, 1959
H. E. STOVER
2,877,493
DEVICE FOR MOLDING GASKETS
Filed Jan. 4, 1956
6 Sheets-Sheet 2
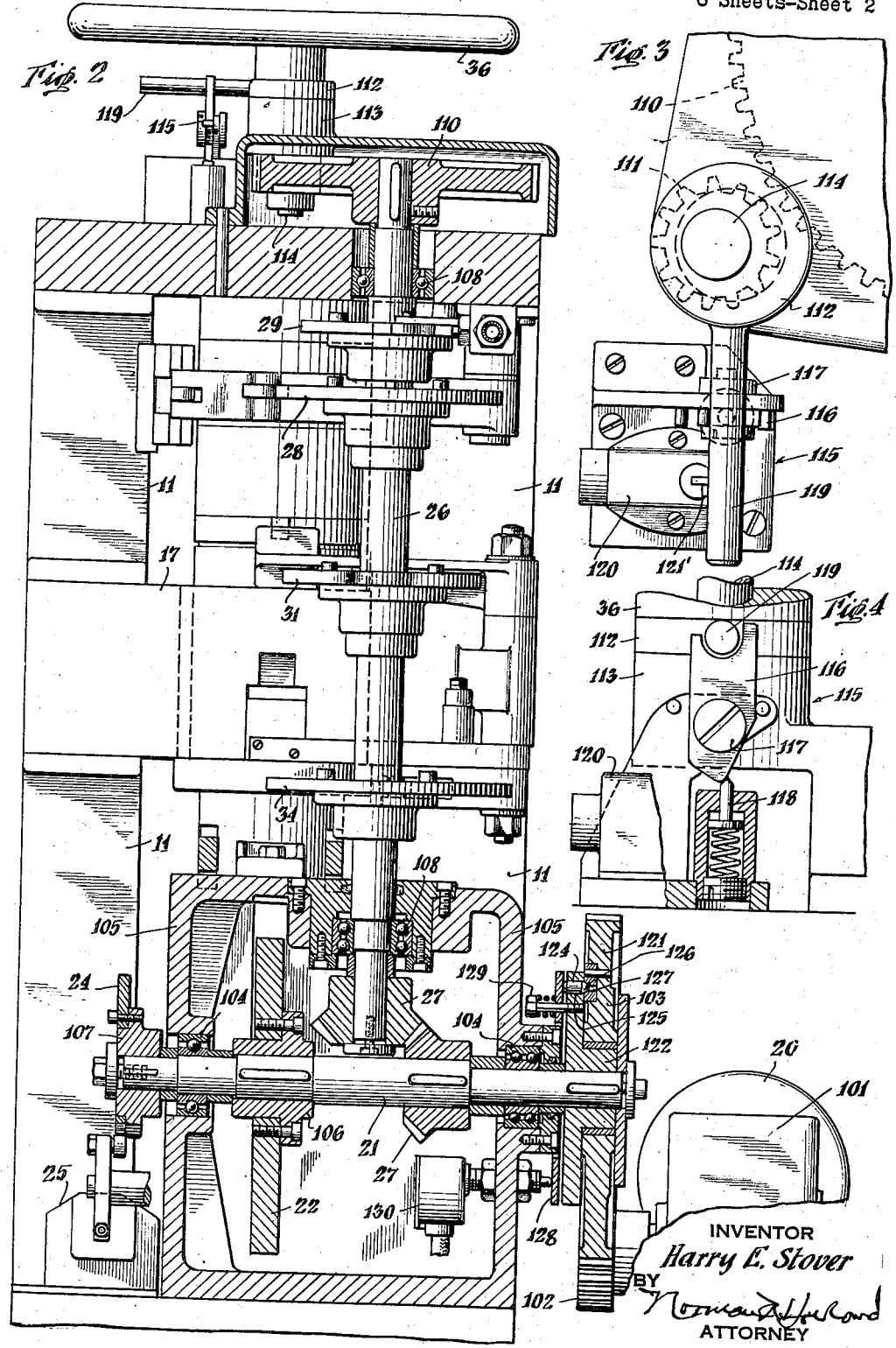
INVENTOR
*Harry E. Stover*
BY
ATTORNEY March 17, 1959
H. E. STOVER
2,877,493
DEVICE FOR MOLDING GASKETS
Filed Jan. 4, 1956
6 Sheets-Sheet 3
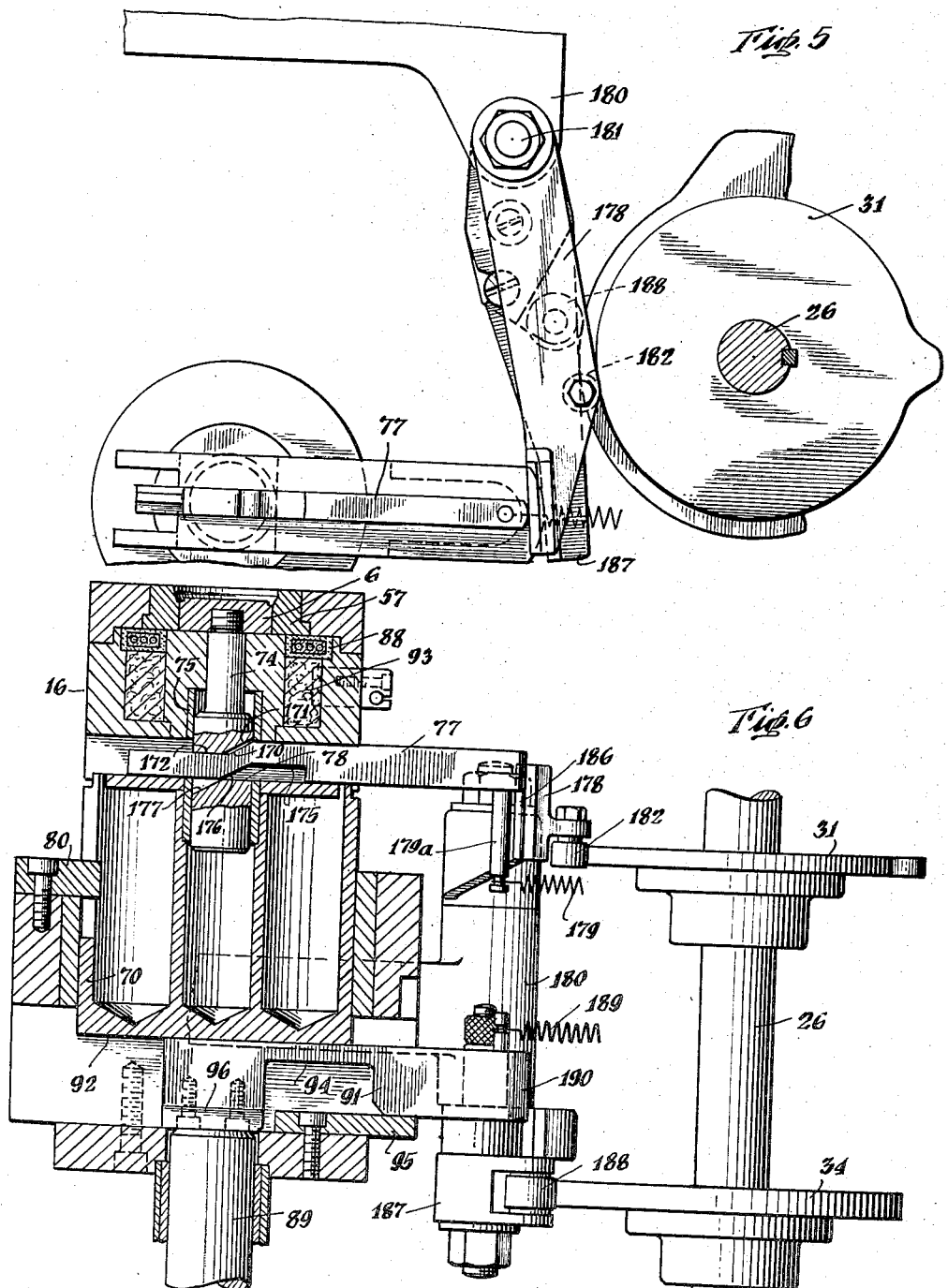
INVENTOR
Harry E. Stover
BY
ATTORNEY March 17, 1959     H. E. STOVER     2,877,493
DEVICE FOR MOLDING GASKETS Filed Jan. 4, 1956     6 Sheets-Sheet 4

INVENTOR
*Harry E. Stover*
BY
*Norman J. Holland*
ATTORNEY

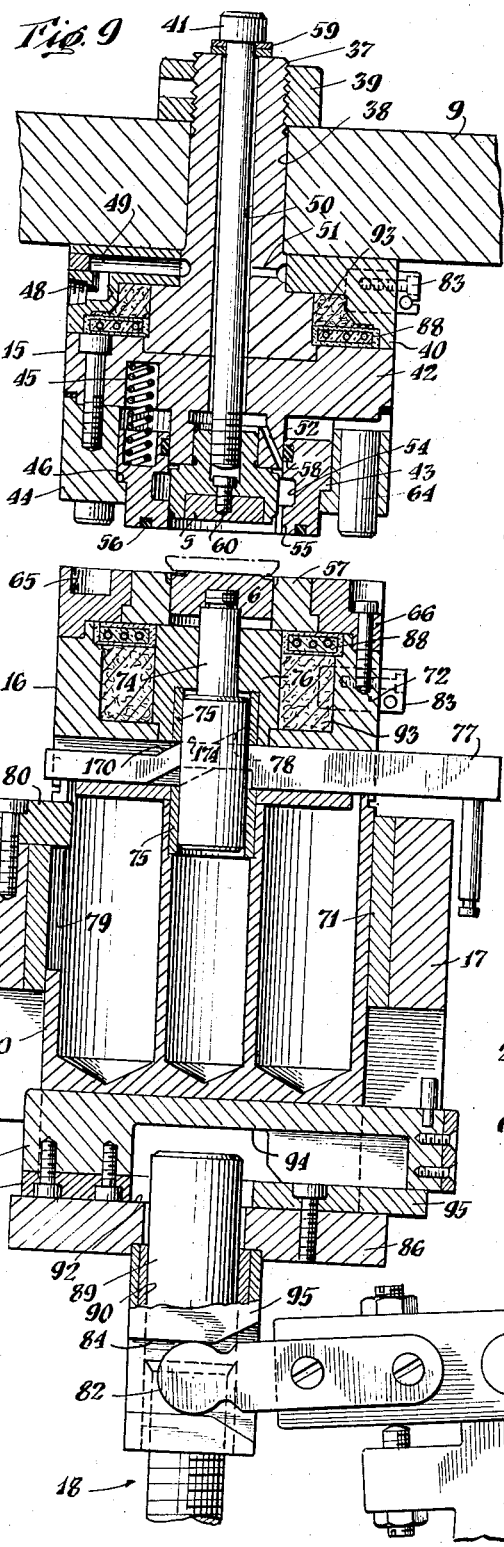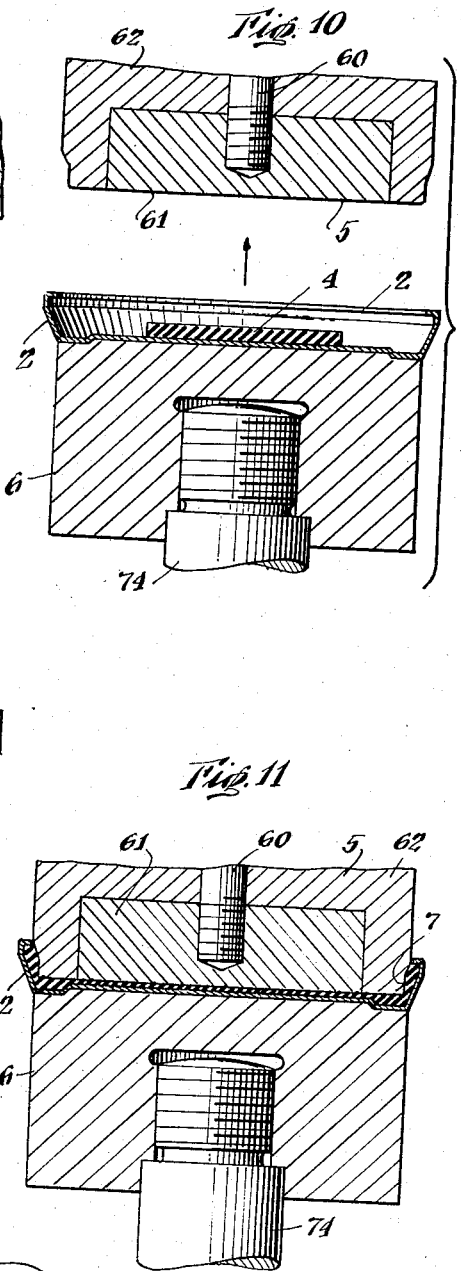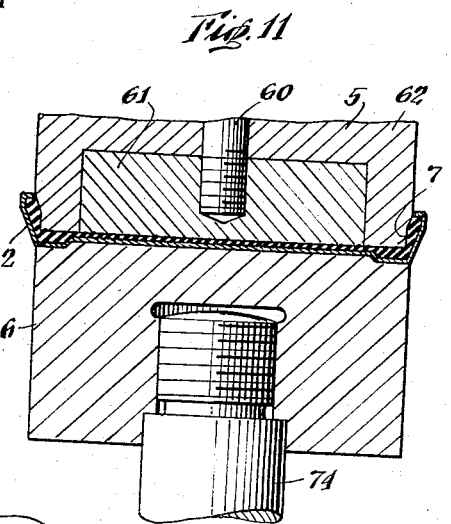

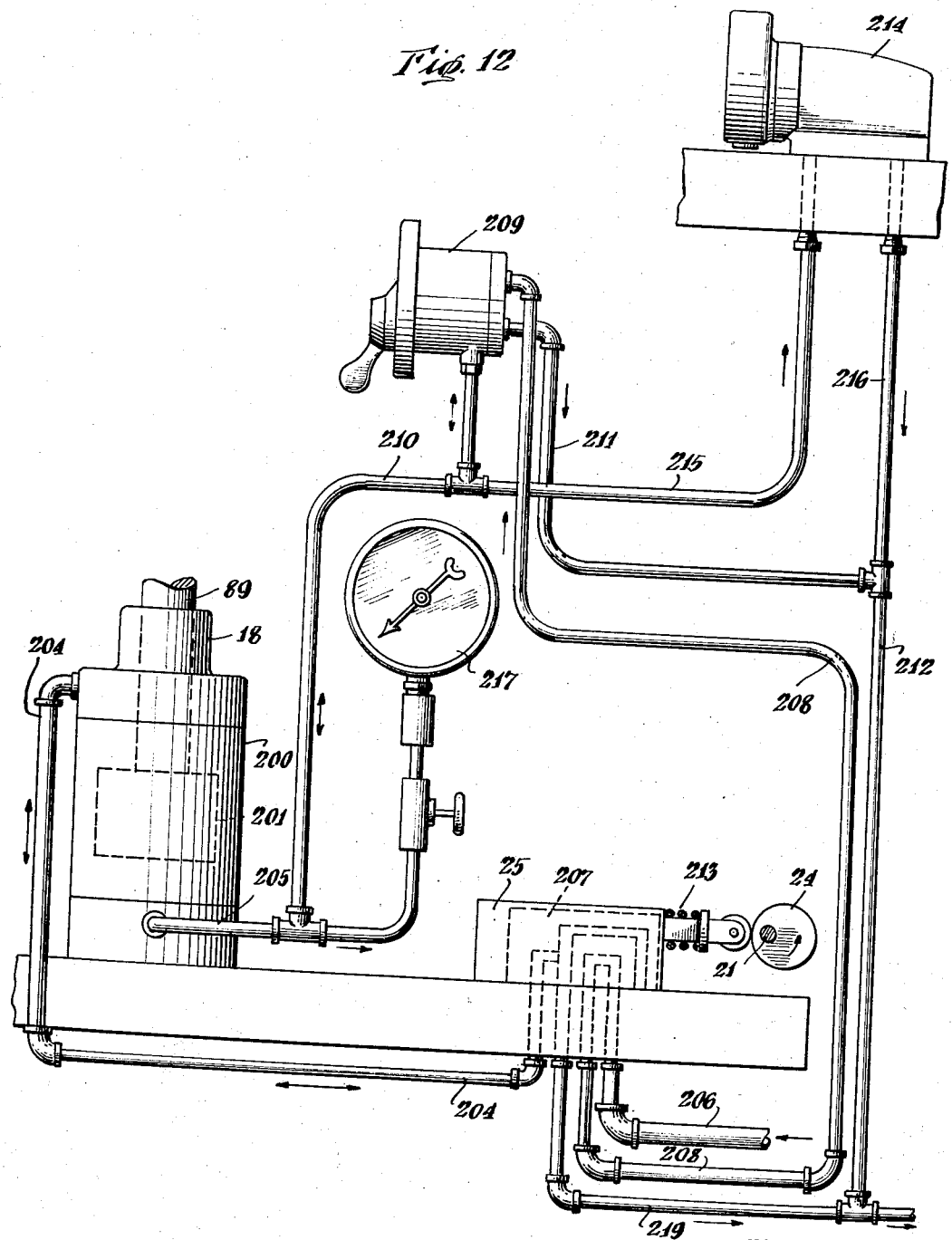

United States Patent Office 2,877,493
Patented Mar. 17, 1959

2,877,493

DEVICE FOR MOLDING GASKETS

Harry E. Stover, Lancaster, Ohio, assignor to Anchor Hocking Glass Corporation, Lancaster, Ohio, a corporation of Delaware Application January 4, 1956, Serial No. 557,283

13 Claims. (Cl. 18—5)

The present invention relates to a means for forming a closure gasket and more particularly to a means for molding a gasket within a closure from a gasket blank inserted in the closure.

Such a gasket blank may comprise, for example, a square or other suitably shaped slug of rubber or other gasket material centrally located within a cup-shaped closure. The means of the present invention molds the slug of gasket material into a suitably shaped sealing gasket such as that disclosed in the Harold L. Crabtree Patent No. 2,772,012, issued November 27, 1956, and owned by the assignee hereof.

In order to mold a satisfactory gasket from a gasket blank within a closure efficiently and economically, a means is required which is rapid, powerful and capable of providing close tolerances. The means of the present invention provide the combination of a high-speed drive for mold opening and loading operations with a separate more powerful drive for the final molding portion of the molding press cycle. The means of the present invention also provide an accurate, rugged and reliable timing mechanism to coordinate the operation of the two drives as well as to coordinate the operation of the drives with the closure handling means for the molding press.

An object of the invention is to provide an improved means for molding.

Another object of the invention is to provide a rapid, accurate and reliable means for molding gaskets in closures having previously inserted gasket blanks.

Another object of the invention is to provide an improved molding device having two drive means, one of which is characterized by a high-speed operation and the other of which is characterized by a high power operation.

Another object of the present invention is to provide an improved mechanical-hydraulic molding press.

Another object of the present invention is to provide an improved timing means for an automatic molding press.

Another object of the present invention is to provide an improved drive means for an automatic molding press.

Another object of the present invention is to provide an improved closure handling means for an automatic closure gasket molding device.

Other and further objects of the invention will become apparent from the illustrative embodiments about to be described or will be indicated in the appended claims, and various advantages not referred to herein will occur to one skilled in the art upon employment of the invention.

A preferred embodiment of the invention has been chosen for purposes of illustration and description and is shown in the accompanying drawings wherein:

Fig. 2 is a section view of the press along the line 2—2 of Fig. 1;

Fig. 3 is an enlarged top plan view of the hand wheel disengaging mechanism;

Fig. 4 is an enlarged front elevational view partially in section of the wheel disengaging mechanism of Fig. 3;

Fig. 5 is a sectional view along the line 5—5 of Fig. 1 of the closure ejector mechanism and the molding assembly latch mechanism;

Fig. 6 is a detailed front elevational view of the closure ejector and the molding assembly latch mechanism of Fig. 5;

Fig. 9 is a detailed front elevational view in section of the molding assembly;

Fig. 10 is a fragmentary enlarged view of the cooperating mold portions of the press in their open position with a closure cap in place;

Fig. 11 is a fragmentary enlarged view of the cooperating mold portions corresponding to Fig. 10 with the mold in its closed or molding position; and Fig. 12 is a diagrammatic view of the hydraulic control system of the press.

The press will first be described generally and then the important features will be described in detail under appropriate headings.

General description

Figure 1:
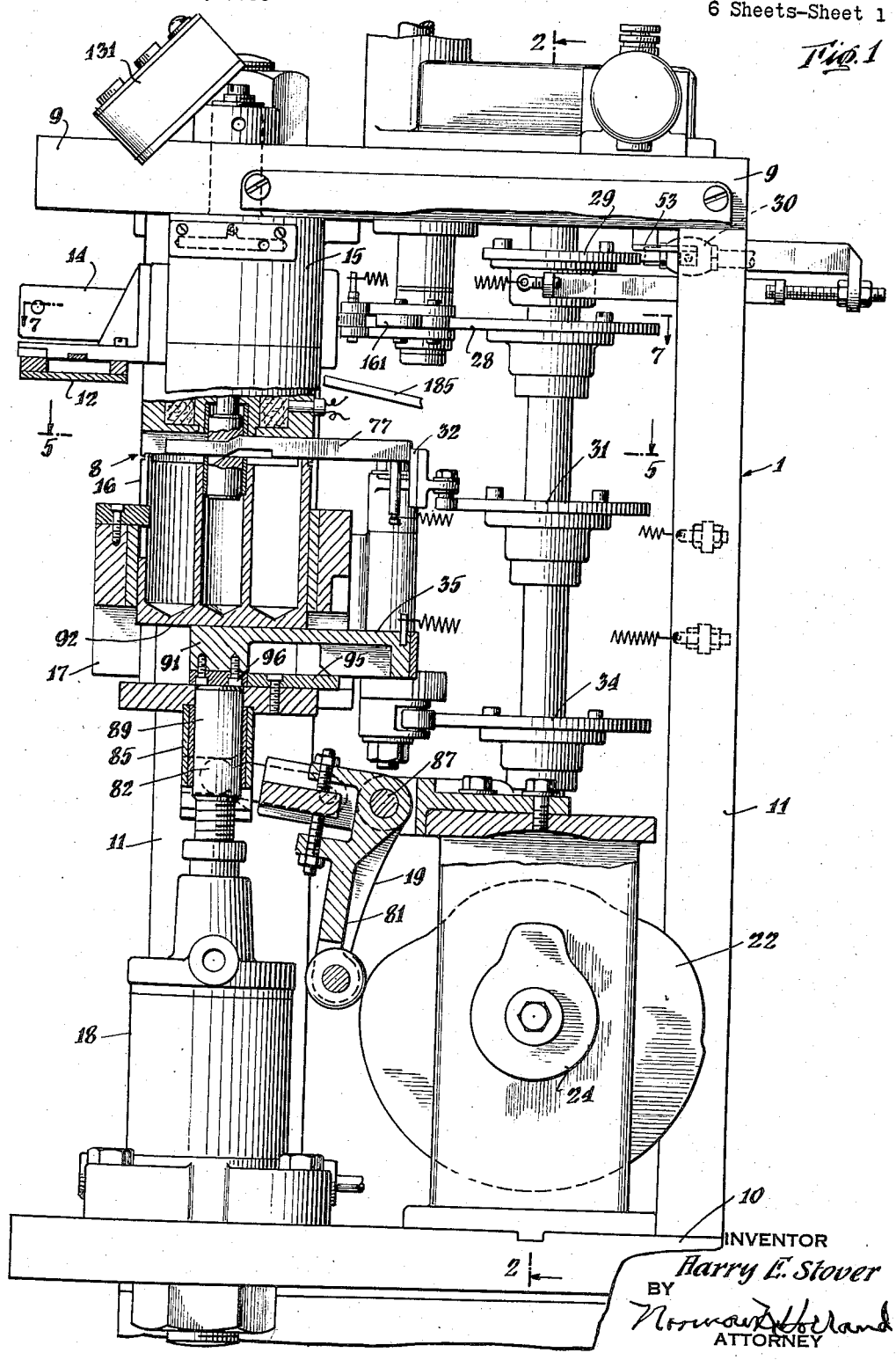
Fig. 1 is a front elevational view partially in section of a preferred embodiment of the press.

The press 1 of Fig. 1 molds a gasket blank previously positioned in a closure into a molded closure gasket. This molding operation is shown in detail in the enlarged views 10 and 11. Thus, a hollow closure 2 having a gasket blank 4 positioned therein is squeezed between a molding punch 5 and a closure support 6. The blank 4 is molded within the closure to form a suitably shaped gasket 7 whose shape is controlled by the combined contours of the molding punch 5 and closure 2. The closure 2 of Fig. 11 has a one-piece gasket 7 molded therein covering its entire inner surface. The amount of pressure required to mold the gasket blank 4 into the gasket 7 is influenced by the gasket material used. With typical rubber compounds, the force required is several tons so that the pressures required are not less than about 3,500 pounds per square inch. Pressures of 3,500 to 10,000 pounds per square inch in the molding have been found suitable to cause the gasket blank 4 to flow outwardly from the center to provide the ringlike edge portions and the relatively thin protective coating across the inner surface of the closure. These pressures also provide a superior bond between the metal closure and the gasket 7 so that the gasket 7 cannot be scraped or torn from the metal closure during normal usage.

The inner surface of the closures which is covered by gasket 7 may have a coating such as a vinyl base coating applied prior to the insertion of the gasket blank 4. The molding of the gasket blank 4 under the above high pressure causes the gasket material of gasket blank 4 to flow radially outwardly to scrub or squeegee air film molecules from the metal closure surface or the vinyl base to provide a close bond with the vinyl coating or the metal. The strength of the bond is believed to be due to a molecular interlocking between the gasket material and the vinyl base coating or the metal surface of the closure caused by the high molding pressures.

High gasket molding pressures in the range discussed above also result in gaskets of optimum and uniform density and toughness throughout to provide uniform sealing pressures on container rims. Other gasket shapes may be formed as desired with suitably shaped dies or punches covering all or a portion of the closure inner surface.

The press 1 (Fig. 1) has a molding assembly 8 mounted between upper and lower mounting plates 9 and 10, respectively, which performs the above described molding operation at high speed and with the above described high pressures. Suitable support members 11 connect mounting plates 9 and 10.

Closures 2 having a gasket blank 4 positioned therein are supplied to the press 1 adjacent mold assembly 8 on a guideway 12 shown at the upper left side of Fig. 1. A closure feed mechanism indicated generally at 14 moves the closures 2 one at a time into the mold assembly 8 where the above described molding operation takes place.

The mold assembly 8 has a stationary upper mold portion 15 attached to upper plate 9 and a reciprocable lower mold portion 16 slidably mounted in a bearing piece 17 for vertical reciprocation by a combined drive means consisting of a hydraulic drive 18 and a mechanical drive 19 whose functions will be more fully explained hereafter. In its lowered position the reciprocal lower mold portion 16 has been slid downwardly in its bearing piece 17 so that the closure support 6 in its upper portion is spaced from the molding punch 5 in the stationary upper mold portion 15 to allow for the insertion of the closure 2 in the position shown in Fig. 10. The lower mold portion 16 when moved upwardly by the combined hydraulic and mechanical drive moves the closure 2 positioned therein against molding punch 5 of the stationary upper mold portion 15 to mold the gasket blank 4 into the gasket 7.

The mechanical drive 19 and the timing for the hydraulic drive 18 of the mold assembly 8 are controlled by a drive system mounted in press 1 between upper and lower plates 9 and 10 to the right (Fig. 1) of the mold assembly 8.

A drive motor 20 (Fig. 2) turns a horizontal drive shaft 21 which mounts mechanical drive cam 22 to actuate the mechanical drive 19. Drive shaft 21 also mounts hydraulic control cam 24 to actuate a hydraulic control valve 25 which synchronizes the action of the hydraulic drive 18 with the mechanical drive 19, the closure feed mechanism 14 and other parts of the press, as will be explained more fully below.

A vertical drive shaft 26 is driven from horizontal drive shaft 21 by bevel gears 27. A closure feed mechanism cam 28 on vertical drive shaft 26 actuates the closure feed mechanism 14.

Also mounted on the vertical drive shaft 26 are a number of additional cams to control other mechanisms whose operation will be described in detail under appropriate headings. One of these is a vacuum control cam 29 which actuates a vacuum line valve 30 to evacuate air from the closure during the molding operation. Another of the cams is a closure ejector control cam 31 which actuates a closure ejector mechanism indicated at 32 to eject closures from the lower closure support 6 after the molding of gasket 7.

Another cam on vertical drive shaft 26 is a latch mechanism control cam 34 which actuates latch mechanism 35 to control the positioning of the reciprocal lower mold portion 16, as will be more fully described below.

A disengageable hand drive wheel 36 is mounted at the top of vertical drive shaft 26 to allow for hand operation of the drive shafts during the initial settings and adjustments of the press 1 for a run.

The molding assembly

The molding assembly 8 is shown in detail in Fig. 9 and comprises the upper stationary mold portion 15 attached to upper mounting plate 9 and the reciprocable lower mold portion 16 slidably mounted in bearing piece 17.

The upper mold portion 15 has mounting rod 37 inserted into aperture 38 in upper mounting plate 9 and attached thereto by nut 39. A mold seat 40 is held in position against upper mounting plate 9 by mold holder 37. Mold assembly bolt 41 in aperture 50 removably fastens interlocking molding punch 5 and punch holder 42 together and in place against mold holder 37. A ring-like molding punch stripper 43 surrounds molding punch 5, and it is reciprocably mounted between the molding punch 5 and an outer punch strip holder 44. The molding punch stripper 43 is urged downwardly beyond the lower surface of the molding punch 5 by springs 45 so that it disengages a closure 2 from the molding punch 5 during the opening of the molding assembly 8 after the gasket 7 has been formed. The lower position of the molding punch stripper 43 is set by stops 46 on punch strip holder 44.

In order to prevent the entrapment of air beneath the gasket 7 while it is being formed causing subsequent blistering of the gasket 7, air is evacuated from the mold cavity surrounding closure 2 and between molding punch 5 and closure 2. If small air bubbles are compressed in or beneath the gasket by the molding operation, they tend to expand later when the molding pressure is removed, causing pockets in, and blisters on, the gasket. An air outlet 48 in the side of the stationary mold portion 15 is connected through air valve 30 to an air pumping system to draw the air from the mold assembly. Air valve 30 is controlled by vacuum control cam 29 through cam follower 53 (Fig. 1) on drive shaft 26 so that air is evacuated from the closure 2 as the molding punch 5 and the closure support 6 close on it. A conduit connecting air outlet 48 and molding punch 5 comprises channel 49 in mold seat 40 which communicates with vertical aperture 50 through channel 51 in mold holder 37. The aperture 50 communicates with the lower side of the molding punch 5 by way of channel 52 in punch holder 42, annular channel 54 in punch stripper 43 and a plurality of spaced grooves 55 around the edge of annular channel 54. In order to form a chamber around closure 2 as the mold closes, the punch stripper 43 has a resilient washer or O-ring 56 to form a hermetic seal with the die ring 57 and resilient washer or O-ring 58 to form a hermetic seal with punch holder 42. As lower mold portion 16 moves upwardly at the beginning of the gasket molding operation O-ring 56 contacts die ring 57 of the lower mold portion 16 to form a hermetic seal therewith. As the lower mold portion 16 continues to move upwardly O-ring 58 maintains a hermetic seal between the punch stripper 43 and the punch support 42. During the time between when O-ring 56 contacts die ring 57 and the molding punch 5 begins to mold the gasket blank 4, the air valve 30 is opened by the vacuum control cam 29 so that air is withdrawn from the hermetically sealed space about a closure 2. A tight fit between mold holder 37, mold seat 40, and punch holder 42, as well as washers 59 on bolt 41, prevent leakage in the conduit leading to air outlet 48.

In Figs. 9 and 10 a preferred embodiment of the molding punch 5 is shown formed of two sections removably held together by bolt 60. These sections comprise an outer section 61 and an inner section 62, either or both of which may be changed to vary the shape of the molded gasket 7. Where the closure size is changed, punch stripper 43, closing support 6, and die ring 57 may also be replaced with suitably shaped replacements.

Guide pins 64 seated in punch stripper holder 44 engage sockets 65 in die holder 66 to maintain an exact alignment between the upper and lower mold portions 15 and 16, respectively, in their closed position.

The reciprocable lower mold portion 16 has an enlarged bearing portion 70 which is slidably mounted in bearing 71 of the horizontal bearing piece 17. Die plate 72 is fastened to the top of the bearing portion 70 to position ring-like die holder 66 and the die ring 57 therein. The closure support 6 is slidably mounted in the die ring 57 to support the closures 2 during the molding operation. The slidable mounting of the closure support 6 is used to lift the closure clear of the die ring 57 after the molding operation to allow the closure 2 to be ejected from press 1. The closure support 6 is raised vertically by a lift rod 74 slidably mounted in bearings 75 in die support member 76 and the bearing portion 70. A sliding cam lever 77 cooperates with a slot 78 in lift rod 74 to raise the closure support 6, as will be more fully described below under the heading, "Closure Ejector and Latch Drives." A vertical slot 79 in bearing portion 70 and a guide pin 80 attached to the bearing piece 17 maintain the lower mold portion 16 in a predetermined radial alignment.

The drive means which reciprocates lower mold portion 16 comprises the hydraulic drive 18 and the mechanical drive 19. The mechanical drive 19 comprises a bell crank 81 connected to lower mold portion 16 by a ball joint having a ball 82 on crank 81 and a bearing 84 on a bearing piece 85 of lower mold portion 16. The bearing piece 85 is connected to bottom plate 86 of the enlarged bearing portion 70. As the bell crank 81 is rocked on its pivoted mounting 87 by a cam 22 which will be further described below, the ball 82 engaging bearing 84 reciprocates the lower mold portion 16 in a vertical direction.

In the preferred embodiment the bell crank 81 has two horizontally spaced balls 82 engaging two spaced bearings 84 on bearing piece 85. Between the spaced bearings 84 a piston 89, connected to the hydraulic drive 18, is slidably fitted in a bearing 90 so that it may intermittently engage and move the lower mold portion, as will be described below.

The mechanical drive 19 moves the lower mold portion 16 relatively rapidly over a relatively large portion of its total travel between its open and closed positions and the hydraulic drive 18 moves the lower mold portion with great power over the relatively short final portion of its travel during the actual molding operation on the gasket blank 4. Thus, the mechanical drive 19 provides an easily controlled and rapid opening motion for the mold portions to allow for the insertion and ejection of the closures and the hydraulic drive 18 provides an even more easily controlled molding drive of great power for the actual forming of the gasket 7 from the gasket blank 4.

A horizontally reciprocable latch 91 is mounted in slot 92 in enlarged bearing portion 70 to accommodate for the differing lengths of travel of the mechanical drive 19 and the hydraulic drive 18. Thus, in order to lower the lower mold portion 16 rapidly a relatively great distance, it is necessary to provide clearance for the hydraulic piston 89 which moves up and down only a fraction of the distance that the lower mold portion 16 does. This is done by providing a recess 94 in latch 91. As the lower mold portion 16 moves downwardly the latch 91 is moved to the left, as seen in Fig. 9, so that the upper end of hydraulic piston 89 enters recess 94. When the mechanical drive 19 has moved the lower mold portion 16 to a position just prior to the final molding operation on the gasket blank 4, the latch 91 is moved to the right against stop 95 to the position shown in Fig. 1. The top of hydraulic piston 89 contacts bearing portion 96 of the latch 91 so that upward motion of the piston 89 completes the upward motion of the lower mold portion 16 to complete the molding action on gasket blank 4 in closure 2. The hydraulic control system and its timing, the mechanical drive system and the latch mechanism drive will be more fully described below under suitable headings.

Ring-shaped electrical heaters 88 are provided in the upper and the lower mold portions 15 and 16 to heat the mold portions to the correct molding temperatures. For typical rubber compound gaskets, mold temperatures of about 150° F. have been found suitable for the molding and to partially vulcanize the gasket 7 during the molding action. Thermocouples 83 in the upper and lower mold portions 15 and 16 provide temperature indications for the molds and may be connected to suitable thermostatic controls to maintain the desired mold temperatures. Insulation 93 is placed above heater 88 in the upper mold portion 15 and below heater 88 in lower mold portion 16 to confine the heating to the end portions of the molds.

Timing and drive mechanism

A single cycle of operation of the press comprises the following steps in order: the ejection of a previously molded closure, the loading of another closure 2 containing a gasket blank 4 into the molding assembly 8, the initial rapid closing of the molding assembly by the mechanical drive 19, the evacuation of air from the molding cavity, the operation of the latch 91 and the hydraulic drive 18 to mold the gasket blank within the closure, the withdrawal of the hydraulic piston 89 and the latch 91 and finally the opening of the molding assembly by the mechanical drive 19 for the beginning of another cycle.

A single electrical drive motor 20 (Fig. 2) mounted at the base of the press 1 drives the closure feed and ejection means 14, the latch 91, and the mechanical drive 19. Motor 20 also drives the timing control for the evacuation of air from the mold cavity and the timing control for the hydraulic drive 18. Motor 20 is coupled through a right angle speed reducer 101 and gears 102 and 103 to horizontal drive shaft 21 which is rotatably mounted on bearings 104 in base member 105. Horizontal drive shaft 21 has the mechanical drive cam 22 fastened thereon by a hub 106.

Each rotation of horizontal drive shaft 21 turns the mechanical drive cam 22 through one revolution and the bell crank 19 which raises and lowers the lower mold portion 16 is moved through one cycle, thereby closing and opening the mold assembly 8. Each cycle of the bell crank 19 is accompanied by a cycle of the hydraulic drive 18 to provide the final closing and molding action of the mold assembly 8. The timing of the hydraulic drive 18 is controlled by hydraulic control cam 24 attached to hub 107 on horizontal drive shaft 21. The hydraulic control cam 24 operates hydraulic control valve 25 to control the hydraulic piston 89, as will be explained below with the hydraulic system.

Additional cams used to control the air evacuating means, the closure feed and ejection devices, and the latching mechanism are mounted on a vertical drive shaft 26. Vertical drive shaft 26 is rotatably mounted in bearings 108 and is driven by bevel gears 27 which connect it with horizontal drive shaft 21 so that horizontal drive shaft 21 and vertical drive shaft 26 rotate in synchronism at the same speed. Thus, for each revolution of the horizontal drive shaft 21 with its attached mechanical drive cam 22 and hydraulic control cam 24, there will be a synchronized revolution of vertical drive shaft 26. The vertical drive shaft cams are: the vacuum control cam 29, the closure feed cam 28, the closure ejection cam 31, and the latch mechanism cam 34. These cams are moved through a single cycle by the rotation of the vertical drive shaft 26 to control and coordinate the operation of their driven mechanisms.

An overload cut-out device is incorporated in gear 103 to stop the motor 20 when the load on the horizontal drive shaft 21 exceeds a given amount due to jamming or other mechanical failures within the press. The gear 103 has an outer ring portion 121 journaled to an inner hub 122. The ring portion 121 is prevented from rotating on inner hub 122 by locking pins 124 fitted into apertures 125 in hub 122 and having a beveled end portion 126 protruding into socket 127 in ring portion 121. A ring plate 128 is resiliently held against the locking pins 124 by spring mount 129 so that the ring portion of gear 103 rotates hub 122 for normal loads on shaft 21. Overloads on shaft 21 cause the beveled end portion 126 on the locking pins 124 to slip out of sockets 127 and to thereby force ring plate 128 axially away from the gear hub 122. A switch 130 in the motor control circuit is mounted adjacent to gear 103 so that the radial motion of ring plate 128 opens it and shuts off the drive motor 20.

A disengageable hand wheel 36 is provided to allow for hand operation of the press during setting and adjusting operations. Disengageable hand wheel 36 is mounted on rotatable shaft 114 and connected to vertical drive shaft 26 by gears 110 and 111. An eccentric bearing 112 for the wheel mounting shaft 114 is rotatably held in bearing 113 to move gear 111 on shaft 114 in and out of engagement with gear 110 on vertical drive shaft 26. A latch device 115 shown in detail in Figs. 3 and 4 removably locks the hand wheel 36 in its disengaged position to prevent its accidental engagement while the press is operated by drive motor 20 to protect the operators and the press. Mechanical clamp 116 pivoted at 117 and resiliently held in position by spring loaded pin 118 holds the handle 119 of the eccentric bearing 112 in its disengaged position. An electrical switch 120 in the drive motor 20 power circuit is positioned adjacent the eccentric bearing handle 119 so that its contact arm 121 is engaged by the handle 119 to close the electrical circuit for motor 20 only when the hand wheel 36 is disengaged, thus preventing the operation of the electrical drive motor 20 while the hand wheel 36 is engaged.

Electrical switch 131 mounted adjacent hand wheel 36 is used to start and stop the drive motor 20 to control the operation of the press.

Closure feed mechanism

The closure feed mechanism 14 (shown in detail in Figs. 7 and 8) moves the closures 2 from a closure supply guideway 12 adjacent to the mold assembly 8 into the cavity in the lower mold portion 16 formed by closure support 6 and die ring 57 (Fig. 6) for the molding operation. The closure feed mechanism 14 also cooperates with the ejector means to move the gasket 2 from the mold assembly 8 to a discharge chute 185 after the molding operation, as will be described in detail.

Guideway 12 has adjustable side guides 139 and 140 to confine and line up closures 2 which are supplied to the guideway mouth 141 by a moving belt 142. Closures 2 are supplied by moving belt 142 in amounts in excess of the number required by the molding assembly to insure an adequate supply. The closures 2 align themselves in guideway 12 between the closure feed mechanism 14 and the guideway mouth 141. Additional closures 2 which are moved against the line of closures in guideway 12 beyond the side guide 139 slip around the end of the side guide 139 and are carried clear of the closure feed mechanism 14 by diagonal guide 144 as they are moved by belt 142. These additional closures are carried to another press or to a suitable collector.

Figure 7:
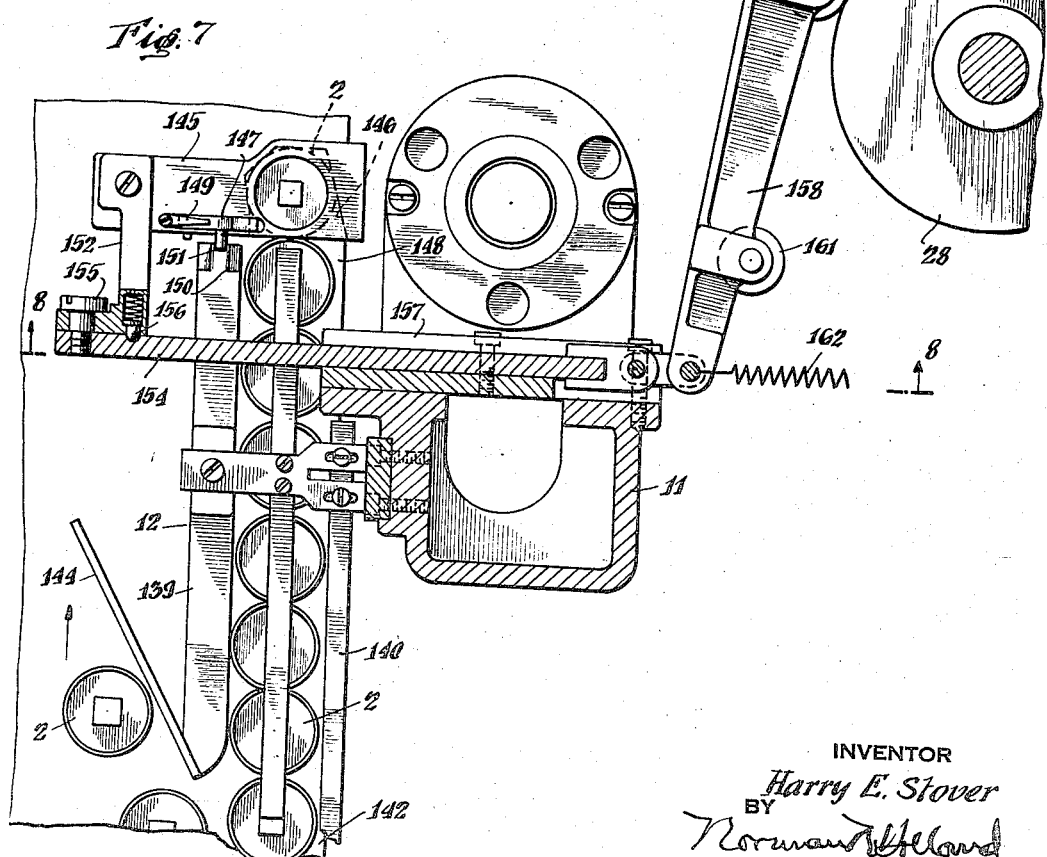
Fig. 7 is a sectional view along the line 7—7 of Fig. 1 of the closure feed mechanism.

The closure feed mechanism comprises a closure carrier 145 having a slot 146 shaped to contain a closure 2. Closures 2 are moved into the slot 146 from guideway 12 by the motion of the moving belt 142 when the carrier 145 is in the closure pickup position adjacent the delivery end 148 of guideway 12, as shown in Fig. 7.

A closure catch 147 is pivotally mounted on closure carrier 145 to prevent the closures 2 from sliding out of slot 146 while the carrier is moving the closure 2 into position above the closure support 6 in lower mold portion 16. Catch 147 is spaced slightly from the edge of closure 2 to allow closure 2 to drop from slot 146 onto the recessed closure support 6. The catch 147 is normally held in its downward position partially across the open edge of slot 146 by spring 149. When the closure carrier 145 is in its closure-receiving position with slot 146 adjacent the delivery end 148 of guideway 12, cam surface 150 on side guide 139 contacts cam follower pin 151 on the catch 147 to lift catch 147 clear of the slot 146 to allow a closure 2 to be moved into the slot 146 by the moving belt 142.

The closure carrier 145 is pivotally mounted by bracket 152 on a reciprocating carrier slide 154 which moves the closure carrier 145 from its closure receiving position at the delivery end 148 of guideway 12 to its closure feed position above closure support 6 and between the upper and lower mold portions 15 and 16.

The bracket 152 for closure carrier 145 is pivotally attached to carrier slide 154 by pivot 155 and is removably locked in its correct position by a spring pin 156. The closure carrier 145 may be swung clear of the moving belt 12 when desired by swinging it upwardly with enough force to disengage spring pin 156.

The carrier slide 154 is slidably mounted in a guideway 157 fastened to support member 11. The carrier slide 154 is driven by a cam follower arm 158 pivotally mounted on pivot 159 and having a cam follower roller 160 in contact with the closure feed cam 28. Closure feed cam 28 is rotated by the vertical drive shaft 26 one revolution for each molding cycle of the molding assembly 8 and its surface is suitably shaped to move the closure carrier 145 between the upper and lower mold portions to position a closure therein during the interval in the molding cycle when the mold portions 15 and 16 are open. A second cam follower roller 161 is provided spaced further from the pivot 159 than cam follower roller 160 to contact closure feed cam 28 to position and steady the cam follower arm 158 during the portion of the cam 28 rotation when the closure carrier 145 is in the closure delivery position above closure support 6. Spring 162 yieldably holds the rollers 160 or 161 of the cam follower arm 158 in position against the closure feed cam 28.

Closure ejector and latch drives

The closure ejector and the latch mechanism are shown in detail in Figs. 5 and 6.

After the gasket 7 has been molded in closure 2 and before another closure is supplied to the closure support 6, the closure with the completed gasket must be removed from the lower mold portion 16. The closure support 6 is slidably mounted in die ring 57 and is attached to a vertically movable lift rod 74 mounted in bearing 75. A sliding cam lever 77 moves horizontally through a slot 78 in the lift rod 74 to raise and lower the closure support 6. Cam lever 77 has an upwardly sloping cam section 170 which cooperates with a correspondingly shaped cam section 171 in slot 78 to raise the lift rod 74 from its lower molding position against surface 172 of cam lever 77 (Fig. 6) to its upper closure ejection position against surface 174 of cam lever 77 when the cam lever 77 is moved to the left (Fig. 9). The lift rod 74 is shown in its lower position in Fig. 6 and in its upper position in Fig. 9. A cut out 175 in the lower surface of the cam lever 77 has an inclined cam surface 176 which cooperates with inclined cam surface 177 on slot 78 of lift rod 74 to move the lift rod downwardly to the molding position when the cam lever 77 is moved to the right. Cam lever 77 is moved to the right by a cam follower arm 178 in sliding contact with cam lever 77 and is moved to the left by spring 179 coupled between pin 179a on cam lever 77 and the press 1 frame. The cam follower arm 178 is mounted on bracket 180 by pivotal connection 181 and it has cam roller 182 which rolls on the closure ejector cam 31 on vertical drive shaft 26. Cam 31 is shaped to raise a closure to the surface of the lower mold portion 16 after the upper and lower mold portion are opened. As the closure carrier 145 moves toward its position above closure support 6 to drop another closure 2 thereon, the leading edge 184 of the closure carrier 145 knocks the ejected closure to the right across the top of lower mold portion 16 onto a suitable chute 185 (Fig. 1) which slides the closure 2 to a suitable conveyor belt (not shown). The cam lever 77 makes sliding contact with an elongated bearing surface 186 on the cam follower arm 178 to allow the cam lever 77 to reciprocate vertically with the lower mold portion 16.

The horizontally reciprocable latch 91 accommodates the lower mold portion 16 for the differing lengths of travel of the mechanical drive 19 and the hydraulic drive 18. The mechanical drive 19 moves the lower mold portion 16 relatively rapidly over a relatively large portion of its total travel and the hydraulic drive 18 moves the lower mold with great power over only a fraction of this distance and provides the final molding force to form the gasket 7 from the gasket blank 4. The reciprocal latch 91 is mounted in slot 92 in enlarged bearing portion 70 so that when it is moved to the left, as seen in Fig. 9, the upper end of the hydraulic piston 89 enters a recess 94 in latch 91. When the mechanical drive 19 has raised the lower mold portion 16 to a position just prior to its final closing with the upper mold portion 15, the latch 91 is moved to the right against stop 95 to the position shown in Fig. 1. The top of hydraulic piston 89 contacts bearing portion 96 of the latch 91 so that upward motion of the piston 89 completes the upward motion of the lower mold portion 16 to complete the molding of the gasket 7. The hydraulic piston also holds the mold assembly 8 in its closed position for a suitable interval to allow initial setting of the molded gasket under high pressure. The latch 91 is reciprocated between its two operating positions by the latch mechanism control cam 34 through the intermediation of cam follower lever 187 on bracket 180. Cam roller 188 on cam follower lever 187 makes contact with the cam 34 and spring 189 holds the latch 91 against the cam follower lever 187. The cam follower lever 187 makes sliding contact with the latch 91 by bearing surface 190 which allows the latch 91 to move vertically with the lower mold portion 16.

*Hydraulic drive*

The hydraulic drive system is shown diagrammatically in Fig. 12. Hydraulic cylinder 200 has a movable piston 201 therein connected to reciprocate the hydraulic piston 89 in a vertical direction. The hydraulic piston 89 is connected with the lower mold portion 16, as is explained in detail above, to supply the final closing and molding force for the mold portions 16 over the final portion of its travel. Hydraulic lines 204 and 205 are connected to the top and bottom, respectively, of the hydraulic cylinder 200 to move the piston 201 up or down under the control of the hydraulic control valve 25, as will be further explained below.

Hydraulic control valve 25 is mounted on the press 1 base adjacent the end of the horizontal drive shaft 21 and it is operated by the hydraulic control cam 24 mounted on the end of horizontal drive shaft 21. Drive shaft 21 makes one revolution for each molding cycle and cam 24 is shaped to coordinate the operation of the hydraulic drive by suitably operating the hydraulic control valve 25.

Hydraulic control valve 25 has an input line 206 connected to a suitable source of hydraulic fluid under pressure (not shown). In order to raise the piston 201 to provide the molding force for the lower mold portion 16, the slide 207 of control valve 25 is moved to the right by spring 213 and cam 24, thereby connecting the input line 206 to coupling line 208 which leads through an adjustable flow control valve 209 into coupling line 210 to the lower side of piston 201. The flow control valve 209 is set to give a desired speed of motion of the piston 89 for the gasket molding action. Flow control valve 209 reduces the amount of hydraulic fluid being supplied to the lower end of the piston 201 by diverting a portion of the fluid through a return line 211, 212 to the hydraulic fluid reservoir (not shown). In order to prevent excessive hydraulic pressure in the hydraulic cylinder 200 and the lines 208 and 210, a relief valve 214 is connected to line 210 by coupling line 215. When the pressure in the hydraulic cylinder 200 rises above a predetermined value, relief valve 214 opens and the released hydraulic fluid returns to the hydraulic fluid reservoir by overflow line 216, 212. A meter 217 on hydraulic line 210 indicates the hydraulic pressure in the hydraulic cylinder 200.

When the slide 207 of hydraulic control valve 25 has been moved to the right, as described above, to raise the piston 201, the slide 207 also connects hydraulic line 204 from the top of the cylinder 200 to a hydraulic release line 219 leading to the hydraulic fluid reservoir to prevent a pressure build-up above the hydraulic piston 201.

At the completion of the molding the hydraulic control cam 24 moves the slide 207 to the left to reverse the hydraulic flow so that the lowering of the hydraulic piston 89 is assisted by hydraulic fluid under pressure above piston 201. Line 204 is connected to the source of hydraulic fluid under pressure through input line 206 and hydraulic fluid is released from beneath piston 201 through line 210, flow control valve 209, line 208, slide 207 and exhaust line 219 which connects to the hydraulic fluid reservoir.

Molding pressure of from 3,500 to 10,000 pounds per inch at a temperature of approximately 150° F. have been found to form gaskets of uniform density and suitable toughness to provide closures having uniform sealing pressures around the container rims.

*Operation*

The operation of the various portions of the press has been described in detail above. A brief summary will be given below of the cooperation of the parts as the molding press moves through a single molding cycle, i. e., from the supplying of a closure to the press with a gasket blank positioned therein until the closure with a completely molded gasket is ejected from the press.

At the completion of one molding cycle the lower mold portion 16 is in its lowered position spaced from the upper mold portion 15 to allow the entry of a closure into the mold assembly 8. Belt 142 (Fig. 7) moves a continuous supply of closures 2 to the guideway 12 for entry into the closure carrier 145. As closure carrier 145 returns from ejecting the previously molded closure, it reaches the closure receiving position shown in Fig. 7. Latch 147 is opened by cam surface 150 to admit a closure 2 gasket side up into the slot 146 of the closure carrier 145. The closure carrier 145 is next moved between the separated upper and lower mold portions 15 and 16 with latch 147 closed to retain closure 2 in place of the carrier slot 146.

As the closure 2 is moved between the mold portions 15 and 16, the closure support 6 is moved downwardly within the die ring 57 of the lower mold portion 16 by the ejector slide 77 (Fig. 6). This forms a recessed seat for the closure being carried into the mold assembly 8 by the closure carrier 145. As the slot 146 of the closure carrier 145 moves above the recessed closure support 6, the closure 2 drops onto the support 6 in position for the subsequent molding of the gasket blank 4. The closure carrier 145 now moves back toward the closure guideway 12 clear of the mold assembly 8.

Figure 8:
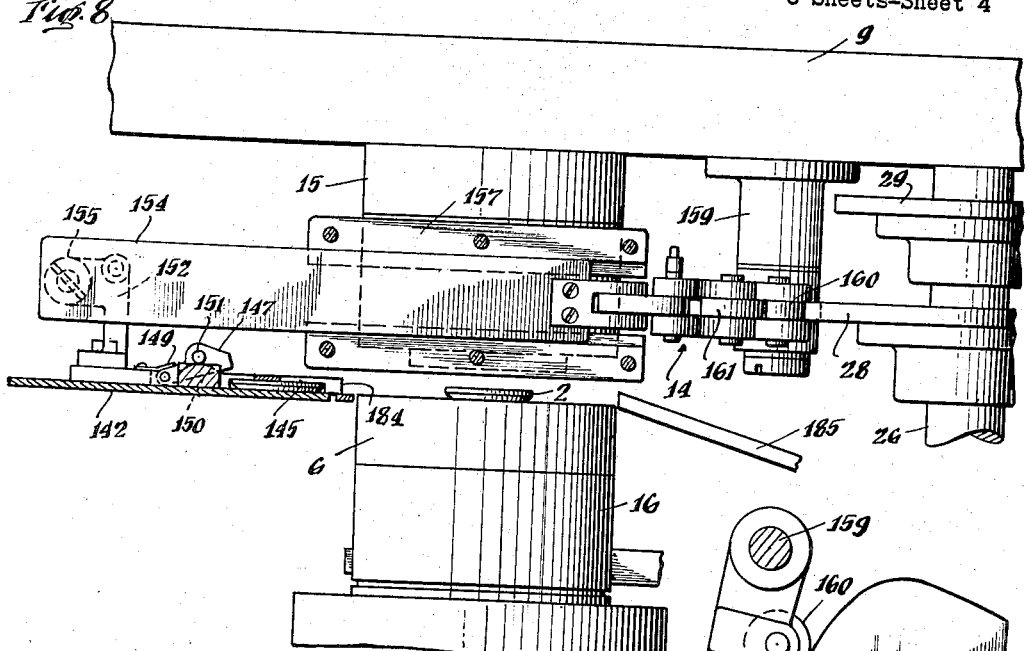
Fig. 8 is a detailed front elevational view of the closure feed mechanism of Fig. 7.

The mechanical drive 19 actuated by the mechanical drive cam 22 on horizontal drive shaft 21 now begins to move the reciprocal lower mold portion 16 upwardly toward the stationary upper mold portion 15. As the lower mold portion 16 approaches the upper mold portion, the resiliently mounted punch stripper 43 makes contact with the advancing lower mold portion 16 and forms a hermetically sealed chamber with the closure support 6 and the die ring 57. As the hermetically sealed chamber is formed, the vacuum control valve 29 opens air valve 30 to connect it to a pump or other evacuating device to form a vacuum about the closure 2. When the mechanical drive 19 has raised the lower mold portion a substantial portion of its travel, latch 91 is moved to the right (Fig. 1) so that its bearing portion 96 is above the hydraulic piston 89. Hydraulic piston 89 is now raised by the piston 201 to close the mold portions on the closure 2 to mold the gasket blank 4 into gasket 7. The hydraulic piston 89 remains in its uppermost position for a short interval to complete the molding action on the gasket 7. The hydraulic drive 18 then lowers the piston 89 until latch 91 is free and then latch 91 is returned to its mechanical drive position with the recess 94 above the piston 89 so that the lower mold portion 16 may be moved downwardly with respect to piston 89. The mechanical drive 19 now lowers the lower mold portion 16 to separate it from upper mold portion 15. The cam lever 77 of the closure ejection means 32 now is moved to the left (Fig. 9) to lift the closure support 6 to raise the closure 2 to the top of lower mold portion 16 as seen in Fig. 8. As the closure carrier 145 moves to the right between the open portions of the mold assembly 8 to supply another closure 2, its right edge strikes the raised closure 2 and knocks or slides it into inclined chute 185 which carries it to a suitable closure removal means.

It can be seen that an improved gasket molding press has been disclosed which molds a closure lining gasket in a hollow closure shell. The press combines the speed and simplicity of a mechanical press with the high, controlled molding forces of a hydraulic press. The press is also adaptable for various sizes of closures and gasket shapes as the molding parts may be removed and changed as necessary. An improved closure feed and ejection system has been disclosed capable of supplying closures to the press in a continuous stream and with a relatively simple, jam-proof action so that the press operates with a high degree of reliability. The mold has an improved design adapted for use to provide a vacuum adjacent to the closure during the molding operation to prevent subsequent blistering of the molded gasket.

The press has a relatively simple and rugged timing system for the closure handling and molding operations which has a smooth and accurate operation and which is also easily adjusted. The press is also provided with novel safety devices to protect the operators from injury and the press from damage. The press is particularly adapted, due to its rugged construction and high molding power, for use with gaskets having a large area covering substantial portions of a closure such as gaskets which have side portions and intermediate cover portions covering the entire inner surface of a closure.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device for molding closure gaskets the combination of a pair of cooperating molds one of which is reciprocably mounted for motion toward and away from the other from an open to a closed molding position, a first drive means to move said reciprocably mounted mold relatively rapidly through a substantial portion of the distance from the open to approximately the closed position, a second relatively powerful drive means fixedly mounted with respect to said other mold to move the reciprocably mounted mold through the final portion of its motion to the closed position to perform the molding operation, a latch means movably mounted adjacent to the reciprocably mounted mold, and a drive means for said latch means to move it to a position intermediate the reciprocably mounted mold and said second drive means while said second drive means is moving the reciprocably mounted mold.

2. A press for molding closure gaskets within closures having a gasket blank of predetermined size and thickness positioned therein comprising a fixed mold portion, a movable mold portion reciprocably mounted for motion toward and away from the fixed mold portion, a normally recessed closure support in one of said mold portions having a surrounding die ring adapted to support the side walls of a closure on said closure support, a molding punch on said other mold portion positioned to cooperate with the closure support and the die ring to mold a gasket blank within a closure on said seat, closure insertion means adjacent the closure seat comprising a slide member reciprocally mounted to move a closure carrier across the face of said mold portion containing said closure support whereby a closure is dropped into the closure seat for molding between said mold portions, and a slidably mounted ejector rod positioned beneath said closure support and operatively connected therewith to raise said closure support to move a previously molded closure into the path of said closure carrier whereby the motion of said closure carrier slides the previously molded closure from between the mold portions, drive means for said movable mold portion comprising a mechanical drive operatively connected thereto to move it a substantial portion of the distance between the open and the closed positions of the mold portions and a hydraulic drive means operatively connected thereto to move it the remaining portion of the distance, and a drive means for said ejector rod synchronized with the movable mold portion drive means whereby the ejector rod is raised while the mold portions are opened.

3. The press as claimed in claim 2 in which said molding punch, said closure support and said die ring are removably mounted on the mold portions for removal and replacement.

4. In a molding press the combination of first and second mold portions, said second mold portion being reciprocably mounted for motion toward and away from said first mold portion, a drive means for said second mold portion comprising a crank pivotally mounted on the press, a rotatable cam, a drive means for said rotatable cam, said crank having one end in contact with said cam and its other end pivotally connected to said second mold portion whereby said cam moves said second mold portion through the intermediation of said crank, a hydraulic drive fixedly mounted with respect to said first mold portion, a piston reciprocated by said hydraulic drive, a contact end on said piston adjacent to said second mold portion, a latch reciprocably mounted adjacent said second mold portion and said contact end of said piston whereby it may be moved from a first position substantially filling the space between the contact end of said piston and said second mold portion whereby motion of said piston is transmitted to said second mold portion and a second position remote from said contact portion of said piston whereby said second mold portion may be moved independently of said piston by said crank, and a drive means for said latch.

5. The press as claimed in claim 4 in which said hydraulic drive is controlled by a cam rigidly coupled to said rotatable cam.

6. The press as claimed in claim 4 in which said hydraulic drive and said latch drive means are each controlled by cams operatively connected to said drive means for said rotatable cam.

7. The press as claimed in claim 6 in which said drive means for said rotatable cam is operatively connected to said rotatable cam through an overload cut-off.

8. In a gasket molding press, the combination of a fixed mold portion, a movable mold portion, said fixed and movable mold portions cooperating to mold a gasket in a closure pressed therebetween, a mechanical drive operatively connected to said movable mold portion to move it a substantial portion of the distance from an open position with the mold portions in spaced relation to a closed position with the molds in contact, a hydraulic drive means operatively connected to the movable mold portion to move it the final portion of the distance toward the closed position, and said mechanical drive comprising a hand operated drive and an electric motor drive, and a switch means coupled to said hand drive whereby operation of said hand drive disconnects said electric motor drive.

9. The molding press as claimed in claim 8 wherein said hand operated drive comprises a hand wheel removably coupled to the electric motor drive by an eccentric bearing mounting, said eccentric mounting having a handle which is positioned to engage and close said switch means when it has moved the eccentric bearing mounting to a position where the hand wheel is disconnected from the electric motor drive.

10. In a molding press the combination of first and second mold portions, said second mold portion being reciprocably mounted for motion toward and away from said first mold portion, a drive means for said second mold portion comprising a crank pivotally mounted on the press, a rotatable cam, a drive means for said rotatable cam, said crank having one end in contact with said cam and its other end pivotally connected to said second mold portion whereby said cam moves said second mold portion through the intermediation of said crank, a hydraulic drive, a piston reciprocated by said hydraulic drive, a contact end on said piston adjacent to said second mold portion, a latch reciprocably mounted adjacent said second mold portion and said contact end of said piston whereby it may be moved from a first position substantially filling the space between the contact end of said piston and said second mold portion whereby motion of said piston is transmitted to said second mold portion and a second position remote from said contact portion of said piston whereby said second mold portion may be moved independently of said piston by said crank, a drive means for said latch, said hydraulic drive and said latch drive means each being controlled by cams operatively connected to said drive means for said rotatable cam, and said drive for said rotatable cam comprising an electric motor drive and a hand operated drive, and a switch means coupled to said hand drive means whereby said electric drive motor is automatically cut off by the operation of said hand drive means.

11. The molding press as claimed in claim 10 wherein said hand operated drive comprises a hand wheel removably coupled to the electric motor drive by an eccentric bearing mounting, said eccentric mounting having a handle which is positioned to engage and close said switch means when it has moved the eccentric bearing mounting to a position where the hand wheel is disconnected from the electric motor drive.

12. The device as claimed in claim 1 in which said first drive means moves said mold portions to within about the depth of one closure gasket from one another and the second drive means moves the molds together through the final portion of the gasket molding action.

13. The device as claimed in claim 1 in which said first drive means comprises a mechanical drive and said second drive means comprises an hydraulic drive.

References Cited in the file of this patent
UNITED STATES PATENTS

| | | |
|---|---|---|
| 1,575,300 | Weeks et al. | Mar. 2, 1926 |
| 2,325,687 | Kux | Aug. 3, 1943 |
| 2,355,613 | Wacker | Aug. 15, 1944 |
| 2,516,908 | Pottle | Aug. 1, 1950 |
| 2,718,663 | Roger | Sept. 27, 1955 |
| 2,745,135 | Gora | May 15, 1956 |